(12) United States Patent
Ottaviani

(10) Patent No.: US 7,517,926 B2
(45) Date of Patent: Apr. 14, 2009

(54) FLAME-RETARDANT POLYMERIC COMPOSITION WITH LOW HALOGEN CONTENT, A CONCENTRATE OF SAID COMPOSITION, AND A METHOD FOR PREPARING SAID COMPOSITION

(75) Inventor: Gino Ottaviani, Cerreto d'Esi (IT)

(73) Assignee: DIAP S.r.l., Cerreto d'Esi (IT)

( * ) Notice: Subject to any disclaimer, the term of this patent is extended or adjusted under 35 U.S.C. 154(b) by 382 days.

(21) Appl. No.: 10/569,499

(22) PCT Filed: Aug. 3, 2004

(86) PCT No.: PCT/EP2004/008676

§ 371 (c)(1),
(2), (4) Date: Feb. 27, 2006

(87) PCT Pub. No.: WO2005/019330

PCT Pub. Date: Mar. 3, 2005

(65) Prior Publication Data

US 2007/0004831 A1   Jan. 4, 2007

(30) Foreign Application Priority Data

Aug. 25, 2003 (IT) .......................... MI2003A1663

(51) Int. Cl.
  *C08K 5/3492* (2006.01)
  *C08K 5/098* (2006.01)
  *C08K 3/10* (2006.01)
(52) U.S. Cl. .................. 524/100; 524/408; 524/484
(58) Field of Classification Search ................ 524/100, 524/408, 484
See application file for complete search history.

(56) References Cited

U.S. PATENT DOCUMENTS 4,710,528 A * 12/1987 Bertelli et al. ............. 524/100

FOREIGN PATENT DOCUMENTS

JP             05-117485 A        5/1993

* cited by examiner

*Primary Examiner*—Kriellion A Sanders
(74) *Attorney, Agent, or Firm*—Connolly Bove Lodge & Hutz LLP

(57) ABSTRACT

A flame-retardant polymeric composition comprising (i) a polymer; (ii) a triazine or a mixture of halogenated or non-halogenated triazines; (iii) a bismuth compound of formula $Bi_zA_w$ where A is X, O, $CO_3$, $O_2CO_3$; and (iv) a compound chosen between red phosphorus, a phosphorous compound or an organic compound capable of forming free radicals, in which the maximum content of halogen on the total of the components from (i) to (iv) in said composition is 1 wt %.

20 Claims, No Drawings

FLAME-RETARDANT POLYMERIC COMPOSITION WITH LOW HALOGEN CONTENT, A CONCENTRATE OF SAID COMPOSITION, AND A METHOD FOR PREPARING SAID COMPOSITION

This application is a National Stage of PCT/EP2004/008676 filed Aug. 3, 2004 which in turn claims priority from Italian Application MI2003A001663, filed Aug. 25, 2003.

The present invention relates to a flame-retardant polymeric composition with low halogen content, to a concentrate of said composition, and to a method for preparing said composition starting from said concentrate.

From the U.S. Pat. No. 4,028,333 it is known the use of hydrohalogenated triazine variously substituted as flame-retardant additive for olefin polymers. Such triazine is used in combination with synergistic agents that include, among others, bismuth compounds. The examples show the use of melamine dihydrobromide (containing approximately 50 wt % of bromine) used in an amount of approximately 20 wt % on the final polymeric mixture, which is equivalent to a content of halogen of approximately 10 wt %.

From the U.S. Pat. No. 4,203,882 self-extinguishing polymeric compositions are known comprising non-halogenated triazines, bismuth carbonate, chlorinated paraffin and one or more brominated aromatic compounds. Even though, in the most favourable case, the content of halogen in said compositions is around 1 wt %, they involve the use of halogenated aromatic compounds in addition to melamine, whilst it would be desirable to reduce further the amount of said compounds, for well-known reasons of an environmental and health nature.

From the U.S. patent application No. US 2002/0169240 A2 a flame-retardant composition is known which comprises a phosphate of a brominated aliphatic compound, a source of radicals and possibly a synergistic agent, such as a compound of antimony. The source of radicals is for example, 2,3 dimethyl 2,3 diphenyl butane or 2,3 dimethyl 2,3 diphenyl hexane. In order to obtain an effective final composition it is in any case necessary to use an amount of brominated compound, in particular tribromo neopentyl phosphate, close to 10 wt % or more. Considering that the bromine content of said compound is 67 wt %, it follows that the amount of halogen introduced into the polymeric composition is approximately 5 wt % and over. From the European patent application No. EP 0 618 255 a flame-resistant composition is known comprising bismuth carbonate and from 15 to 40 wt % of a brominated aromatic compound, preferably decabromine diphenyloxide. Considering that the bromine content of said compound is 83 wt %, it follows that the amount of halogen introduced into the polymeric composition is approximately 10 wt % and over.

Also known is the use of red phosphorus as flame-retardant agent for polymeric compositions. However, to be effective, it must be used in an amount of at least 3.5 wt %. Due to the marked colouring that it bestows on the polymer, its use is limited to the cases in which colouring does not represent a constraint on its use. In any case, it would be desirable to be able to reduce the amount thereof in order to diminish its intense colouring effect. Compositions of flame-retardant active principles having a base of melamine and bismuth tribromide with a content of bromine of 33-35 wt % are marketed by the Italian firm SICHIM ALFA S.r.l. under the commercial name SA.FR.2M. To be effective, said compositions of active principles must, however, be used in an amount of at least 3.5 wt % with respect to the polymer, which means in any case introducing more than 1.1 wt % of halogen into the final polymeric composition. Although said amount is substantially lower than that introduced into the polymeric composition according to the teachings of the patents cited previously, it would be desirable to reduce further the halogen content in the final polymeric composition, because of the known environmental problems related to the dangerousness of halogens in the case of combustion of said polymeric compositions both in the case of fire and in the case of voluntary incineration thereof at the end of their life cycle.

The object of the invention is therefore to provide a flame-retardant polymeric composition that is effective and has a low content of halogens and aromatic compounds, so as to meet the regulations on toxicity of combustion products. More particularly, it is an object of the invention to provide a flame-retardant polymeric composition in which the concentration of halogens is so low to be hardly detectable with usual analytical methods.

The aforesaid and other objects and advantages of the invention, as it will appear from the following description, are achieved with a composition comprising:

(i) a polymer;
(ii) a triazine or a mixture of triazines of the general formula (I);

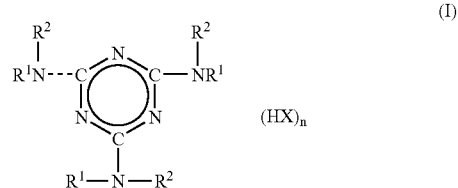

where:
 $R^1$ and $R^2$, which are either the same as one another or different from one another, may be: H; a $C_{1-6}$ alkyl group, either linear or branched, simple or substituted with chlorine or bromine; or an aryl group, either simple or substituted with chlorine or bromine;
 X is chlorine or bromine; and
 n=0, 1, 2, 3
(iii) a bismuth compound of formula $Bi_zA_w$;
 where: A is X, O, $CO_3$, $O_2CO_3$ or any other residue capable of forming a bismuth compound;
 X is a halogen as defined above;
 z and w are integers fulfilling the valences of Bi and A;
(iv) a compound selected from the group consisting of red phosphorus, a phosphorous compound and an organic compound capable of forming free radicals; in which:
 if $R^1$ and $R^2$ is H or a non-halogenated alkyl or aryl group and n=0, then A is X;
 the maximum content of said halogen X on the total of the components from (i) to (iv) in said composition is 1 wt %.

The invention also relates to a concentrate of the aforesaid flame-retardant polymeric composition, in which the amount of active principles from (ii) to (iv) with respect to the polymer (i) is such that the amount of halogen X in said concentrate does not exceed the value n 1%, where 1<n≦40, preferably 5≦n≦20.

Another aspect of the invention is a method for the preparation of the polymeric composition described above, comprising the mixing of said concentrate with fresh polymer (i)

in an amount such as to bring the concentration of halogen X to a value not higher than 1 wt % on the total of said components (i)-(iv).

The polymer which can form part of the flame-retardant composition according to the invention can be chosen from a vast range of polymers, as is known to the person skilled in the art, including polyolefins, ABS resins and polyurethanes. The preferred compositions are the ones that comprise olefin polymers and copolymers. They can be produced starting from a variety of monomers such as propylene, ethylene, butene, isobutene, pentene, hexene, octene, 2-methyl butene, 4-methyl pentene, 4-methyl hexene, 5-methyl hexene, butadiene, pentadiene, hexadiene, styrene and methyl-styrene, by using catalytic systems known to the person skilled in the art, particularly catalytic systems of the Ziegler/Natta type and metallocene catalytic systems. Said olefin polymers also include mixtures of homopolymers, mixtures of copolymers and mixtures of homopolymers and copolymers produced starting from the aforesaid monomers directly in the reactor or as a result of subsequent mixing. Preferred polyolefins are polypropylene and polyethylene, including isotactic, atactic and syndiotactic polypropylene, HDPE, LDPE and LLDPE, random and heterophasic copolymers of propylene, ethylene, butene, hexene and octene. The aforesaid polymers can have a very wide range of Melt-Flow Index (MFI), but typically have values comprised between 0.5 and 30. The flame-retardant composition according to the invention finds advantageous application in polymers for the production of articles by means of moulding or extrusion, for the production of fibres and films.

The triazine of formula (1) is preferably a halogenated melamine of formula (II), obtained from the formula (1) when $R^1=R^2=H$:

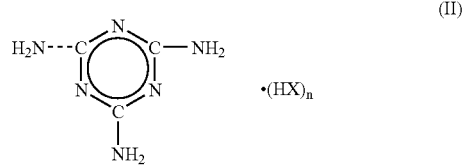

where:
  X is bromine;
  n=0, 1, 2, 3 or a mixture of melamines of formula (II) comprising brominated melamine and non-halogenated melamine.

The brominated melamine of formula (II), expressed as percentage of nitrogen on the total of the components from (i) to (iv), is present in an amount from 0.01 to 1 wt %, preferably between 0.05 and 0.9 wt %, more preferably between 0.08 and 0.8 wt %.

Preferred bismuth compounds are bismuth bromide $BiBr_3$, bismuth carbonate $Bi_2(CO_3)_3$ and bismuth subcarbonate $(BiO)_2CO_3$, this latter compound being also called basic bismuth carbonate or bismuth oxycarbonate and being also expressed by the formula $Bi_2O_2CO_3$. Bismuth, expressed as percentage of elemental bismuth on the total of the components from (i) to (iv), is present in an amount from 0.01 to 0.5 wt %, preferably between 0.02 and 0.04 wt %.

The halogen present in the final composition can be supplied entirely by the triazine or the mixture of triazines of formula (I), or entirely by the bismuth compound, or by both. In particular, the mixture of melamines of formula (II) may consist of non-halogenated melamine and halogenated (brominated) melamine in order to enable a more precise dosage of the amount of total halogen (bromine) present in the polymeric composition. In any case, the overall amount of halogen in the composition according to the invention is not higher than 1 wt % on the total of the components from (i) to (iv). Preferably, it is not higher than 0.9 wt %. The organic compound capable of forming free radicals is preferably selected from the group consisting of: 2,3 dimethyl 2,3 diphenyl butane; 2,3 dimethyl 2,3 diphenyl hexane; poly(1,4-diisopropylbenzene). The organic compound capable of forming free radicals is present in an amount of between 0.01 and 1 wt % on the total of the components from (i) to (iv), preferably between 0.05 and 0.5 wt %.

Expressed as elemental phosphorous, red phosphorus or the phosphorus compound is present in an amount between 0.0.5 and 2 wt % on the total of the components from (i) to (iv), preferably between 0.15 and 1 wt %. Suitable phosphorous compounds are oxides, inorganic or organic phosphates, inorganic phosphinates such as calcium phosphinate. A suitable calcium phosphinate formulation is marketed by the Italian company ITALMATCH CHEMICALS SpA with the trade name PHOSFOLITE IP-C. Since such phosphorous compounds do not have a colouring effect, they are preferred in those applications where typical colour imparted by red phosphorous is undesired, even this latter if present in amounts lower than in the compositions of the prior art.

Preferably, the composition contains both the organic compound capable of forming free radicals and red phosphorus or phosphorus compound. The presence of at least one of these two active principles enables a reduction in the amount of total halogen in the composition to not more than 1 wt %, so obtaining a substantial reduction in the amount of halogen without any loss of efficacy as measured at the test UL 94 V2. The presence of both of the active principles produces a synergistic effect, as illustrated in the examples and discussed more fully hereinafter.

In order to determine the flame-retardant properties of the polymeric composition according to the invention, reference is made to the standard tests of Underwriters Laboratories, USA, in particular to the test UL 94 V2. The UL 94 test is conducted on specimens of polymer of a given thickness, positioned vertically and subjected to ignition. Then it is measured the time that the specimen takes to arrive at self-extinction of the flame and whether the material drips or not during combustion. In short the condition V2 relates to the case where:

the mean time of extinction of the flame is less than or equal to 30 seconds;
  the total time of extinction after a first ignition $t_1$ and after a second ignition $t_2$ for 5 specimens is less than or equal to 250 seconds (total after-flame time $t_1+t_2$ for 5 samples);
  there is no afterflame or afterglow of any specimen up to the holding clamp;
  a specimen of cotton set under the polymer specimen is enflamed by particles or drops of the polymer itself.

The flame-retardant polymeric composition according to the invention may comprise other additives, such as UV stabilizers, antioxidants, thermal stabilizers, lubricants, colouring agents, plastifiers, fillers such as talcum or calcium carbonate, reinforcing agents such as fibre glass, etc., as is known in the art.

The flame-retardant polymeric composition according to the invention can be prepared in various ways, for example by mixing the components directly with the polymer to obtain the desired final concentration of the components themselves in the polymer, or else by preparing concentrates (masterbatches) in which the components (ii), (iii) and (iv) are mixed to a reduced amount of polymer (i). Said concentrate (masterbatch) can be marketed as such and then be diluted by mixing with an appropriate amount of fresh polymer (i) until the desired final concentration is obtained, in which the amount of halogen is not higher than 1 wt % with respect to the sum of the amounts of the components from (i) to (iv). Said method is advantageous to the end user in so far as it enables a convenient dosage of the active principles from (ii) to (iv), which are thus dispersed in a certain amount of polymer (i) and therefore are easier to dose, for example by means of co-extrusion of the concentrate and of the polymer just as such. According to this aspect of the invention, the concentrate of polymer (i) and active principles (ii), (iii) and (iv) is such that the amount of halogen X in said concentrate does not exceed the value n·1%, where $1 < n \leq 40$, preferably $5 \leq n \leq 20$. The flame-retardant composition with the final desired characteristics can therefore be prepared by diluting the concentrate itself with an amount of polymer (i) necessary to bring the amount of bromine to a value that does not exceed 1 wt %.

EXAMPLES

In all the examples, polypropylene homopolymer with MFI 16 g/10 min was used.

UL 94 V2. Example 2 shows that a composition containing just red phosphorus in an amount of 3 wt % does not satisfy the test UL 94 V2.

Examples 3-15 show that compositions according to the invention amply satisfy the conditions of the test UL 94 V2, albeit having a halogen content always lower than 1 wt %, thanks to the presence of small amounts of compound capable of forming radicals or to the presence of phosphorus or a phosphorus compound or to the presence of a combination of them.

Example 5, 12 and 15 show the synergistic effect deriving from the use of a combination of the phosphorous compound and organic compound active principles, which enables a reduction in the values of the test UL 94 V2 to 24, 43 and 19 seconds, respectively. Examples 10 and 15 show that very low values of the UL 94 V2 test can be obtained with an extremely low total amount of Br of 0.1 wt %. Example 5 and 12 show also that halogen can be supplied only by the melamine compound, since the bismuth compound used was bismuth subcarbonate.

| Example | Active principle (ii) Melamine form. (II) (as wt % N) | Active princ. (iii) (as wt % Bi) | | Bromine (as wt % Br) | | Active principle (iv) | | | | Total afterflame time (seconds) (UL94 V2 test) |
|---|---|---|---|---|---|---|---|---|---|---|
| | | $BiBr_3$ | $Bi_2O_2CO_3$ | from $BiBr_3$ | Total | CCDFB (wt %) | CCPIB (wt %) | Red P (wt %) | P Comp. (as wt % P) | |
| 1 Comp. | 0.75 | 0.2 | — | 0.43 | 0.9 | — | — | — | — | 270 |
| 2 Comp. | — | — | — | — | — | — | — | 3.0 | — | not extinguished |
| 3 | 0.75 | 0.2 | — | 0.43 | 0.9 | 0.1 | — | — | — | 45 |
| 4 | 0.75 | 0.2 | — | 0.43 | 0.9 | — | — | 0.17 | — | 35 |
| 5 | 0.75 | — | 0.2 | — | 0.9 | 0.05 | — | — | 0.15 | 24 |
| 6 | 0.09 | 0.023 | — | 0.05 | 0.1 | 0.4 | — | — | — | 72 |
| 7 | 0.09 | 0.023 | — | 0.05 | 0.1 | — | — | 1.55 | — | 111 |
| 8 | 0.2 | 0.05 | — | 0.1 | 0.25 | — | — | 0.7 | — | 94 |
| 9 | 0.2 | 0.05 | — | 0.1 | 0.25 | 0.2 | — | — | — | 107 |
| 10 | 0.09 | 0.023 | — | 0.05 | 0.1 | 0.2 | — | — | 0.7 | 33 |
| 11 | 0.75 | 0.2 | — | 0.43 | 0.9 | — | 0.1 | — | — | 62 |
| 12 | 0.75 | — | 0.2 | — | 0.9 | — | 0.025 | 0.15 | — | 43 |
| 13 | 0.09 | 0.023 | — | 0.05 | 0.1 | — | 0.2 | — | — | 35 |
| 14 | 0.2 | 0.05 | — | 0.1 | 0.25 | — | 0.2 | — | — | 51 |
| 15 | 0.09 | 0.023 | — | 0.05 | 0.1 | — | 0.1 | 0.7 | — | 19 |

The organic compound capable of forming free radicals used in the example was 2,3 dimethyl 2,3 diphenyl butane, known as CCDFB-90, or poly(1,4-diisopropylbenzene), known as CCPIB, both marketed by Degussa. The phosphorous source used was red phosphorous or the calcium phosphinate formulation marketed by the Italian company ITALMATCH CHEMICALS SpA with the trade name PHOSFOLITE IP-C.

The amount of total halogen was always higher than the one brought into the composition by the bismuth compound. The halogen necessary to bring the content to the values indicated was given by the melamine of formula (II), which may advantageously be a mixture of monobrominated melamine and non-halogenated melamine.

The flame-retardant properties were determined according to the test UL 94 V2 as total after-flame time $t_1+t_2$ for 5 samples, described previously. The samples had a thickness of 1.6 mm. The results of the examples are summarized in the table appearing below.

The first two examples are comparison examples.

Example 1 shows that compositions in which the only active principles are non-halogenated melamine and $BiBr_3$ with a total halogen content of 0.9 wt % do not satisfy the test

The invention claimed is:

1. A flame-retardant polymeric composition comprising:
(i) a polymer;
(ii) a triazine or a mixture of triazines of the general formula (I);

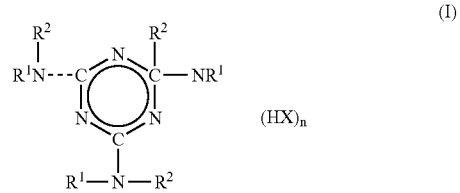

where:
$R^1$ and $R^2$, which are either the same as one another or different from one another, may be: H; a $C_{1-6}$ alkyl group, either linear or branched, simple or substituted with chlorine or bromine; an aryl group, either simple or substituted with chlorine or bromine;

X is chlorine or bromine;
n=0, 1, 2, 3
(iii) a bismuth compound of formula $Bi_zA_w$;
where: A is X, O, $CO_3$, $O_2CO_3$ or any other residue capable of forming a bismuth compound;
X is a halogen as defined above;
z and w are integers fulfilling the valences of Bi and A;
(iv) a compound selected from the group consisting of red phosphorus or a phosphorous compound alone or in combination with an organic compound capable of forming free radicals,
in which:
if $R^1$ and $R^2$ is H or a non-halogenated alkyl or aryl group and n=0, then A is X;
the maximum content of said halogen X on the total of the components from (i) to (iv) in said composition is 1 wt %.

2. The flame-retardant polymeric composition according to claim 1, in which said triazine of formula (I) is a melamine or a mixture of melamines of formula (II), obtained from the formula (I) when $R^1=R^2=H$:

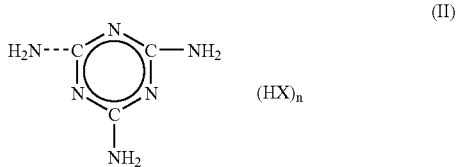

(II)

where:
X is bromine;
n=0, 1, 2, 3.

3. The flame-retardant polymeric composition according to claim 1, in which said bismuth compound is selected from the group consisting of bismuth bromide $BiBr_3$, bismuth carbonate $Bi_2(CO_3)_3$ and bismuth subcarbonate $(BiO)_2CO_3$.

4. The flame-retardant polymeric composition according to claim 2, in which said bismuth compound is bismuth carbonate or bismuth subcarbonate, and said mixture of melamines of formula (II) comprises at least one melamine in which n ≠0.

5. The flame-retardant polymeric composition according to claim 1, in which said triazine of formula (I), expressed as percentage of nitrogen on the total of the components from (i) to (iv), is present in an amount from 0.01 to 1 wt %.

6. The flame-retardant polymeric composition according to claim 5, in which said triazine of formula (I), expressed as percentage of nitrogen on the total of the components from (i) to (iv), is present in an amount between 0.05 and 0.9 wt %.

7. The flame-retardant polymeric composition according to claim 6, in which said triazine of formula (I), expressed as percentage of nitrogen on the total of the components from (i) to (iv), is present in an amount between 0.08 and 0.8 wt %.

8. The flame-retardant polymeric composition according to claim 1, in which said bismuth compound, expressed as percentage of elemental bismuth on the total of the components from (i) to (iv), is present in an amount from 0.01 to 0.5 wt %.

9. The flame-retardant polymeric composition according to claim 8, in which said bismuth compound, expressed as percentage of elemental bismuth on the total of the components from (i) to (iv), is present in an amount between 0.02 and 0.04 wt %.

10. The flame-retardant polymeric composition according to claim 1, in which said organic compound capable of forming free radicals is selected from the group consisting of: 2,3 dimethyl 2,3 diphenyl butane; 2,3 dimethyl 2,3 diphenyl hexane; poly (1,4-diisopropylbenzene).

11. The flame-retardant polymeric composition according to claim 10, in which said organic compound capable of forming free radicals is present in an amount comprised between 0.01 and 1 wt % on the total of the components from (i) to (iv).

12. The flame-retardant polymeric composition according to claim 11, in which said organic compound capable of forming free radicals is present in an amount comprised between 0.05 and 0.5 wt %.

13. The flame-retardant polymeric composition according to claim 1, in which said red phosphorus or phosphorous compound is present in an amount comprised between 0.05 and 2 wt % expressed as elemental phosphorous on the total of the components from (i) to (iv), and said phosphorous compound is selected from the group consisting of phosphorous oxides, inorganic or organic phosphates and phosphinates.

14. The flame-retardant polymeric composition according to claim 13, in which said red phosphorus or phosphorous compound is present in an amount comprised between 0.15 and 1 wt % on the total of the components from (i) to (iv).

15. The flame-retardant polymeric composition according to claim 2, in which the overall amount of bromine is not higher than 0.9 wt % on the total of the components from (i) to (iv).

16. The flame-retardant polymeric composition according to claim 1, in which said polymer (i) is a polyolefin.

17. A concentrate of the flame-retardant polymeric composition according to claim 1, in which the amount of active principles from (ii) to (iv) with respect to the polymer (i) is such that the amount of halogen X in said concentrate does not exceed the value n·%, where $1<n\leq40$.

18. The concentrate of the flame-retardant polymeric composition according to claim 17, in which $5\leq n\leq20$.

19. A method for preparing a polymeric composition comprising mixing a concentrate according to claim 17 with fresh polymer (i) in an amount such as to bring the concentration of halogen X to a value not higher than 1 wt % on the total of said components (i)-(iv).

20. The flame-retardant polymeric composition according to claim 2, in which said polymer (i) is a polyolefin.

* * * * *